United States Patent [19]
Todd

[11] Patent Number: 5,306,452
[45] Date of Patent: Apr. 26, 1994

[54] DEVOLATILIZING AND/OR PROCESSING SYSTEMS AND METHODS

[75] Inventor: David B. Todd, Princeton, N.J.

[73] Assignee: APV Chemical Machinery Inc., Saginaw, Mich.

[21] Appl. No.: 35,717

[22] Filed: Mar. 23, 1993

[51] Int. Cl.$^5$ .......................................... B29C 47/76
[52] U.S. Cl. ............................ 264/102; 264/211.23; 264/349; 366/75; 366/85; 425/203; 425/204; 425/382.4
[58] Field of Search .......... 264/102, 101, 349, 211.23; 425/203, 204, 208, 209, 382.4; 366/75, 85

[56] References Cited

U.S. PATENT DOCUMENTS

| | | | |
|---|---|---|---|
| 3,085,288 | 4/1963 | Street . | |
| 3,164,563 | 1/1965 | Maxwell et al. | 264/102 |
| 3,193,877 | 7/1965 | Edwards . | |
| 3,360,824 | 1/1968 | Schippers | 264/102 |
| 3,459,840 | 8/1969 | Wood | 425/209 |
| 3,712,594 | 1/1973 | Schippers et al. | 425/208 |
| 3,719,350 | 3/1973 | Loomans | 425/203 |
| 4,029,300 | 6/1977 | Morishima et al. . | |
| 4,136,251 | 1/1979 | Bice et al. . | |
| 4,136,968 | 1/1979 | Todd . | |
| 4,385,876 | 5/1983 | Scherping et al. . | |
| 4,663,103 | 5/1987 | McCullough et al. | 264/102 |
| 4,752,135 | 6/1988 | Loomans . | |
| 4,955,186 | 9/1990 | Dollhopf . | |
| 5,123,828 | 6/1992 | Surface | 425/203 |
| 5,130,070 | 7/1992 | Martin | 264/102 |

FOREIGN PATENT DOCUMENTS

| | | | |
|---|---|---|---|
| 2129839 | 12/1972 | Fed. Rep. of Germany | 425/203 |
| 260467 | 9/1988 | Fed. Rep. of Germany | 425/204 |
| 4010692 | 10/1991 | Fed. Rep. of Germany | 264/102 |

OTHER PUBLICATIONS

Page 76, Kunststoffe Magazine, Bd. 63, 1973, H. 2.

Primary Examiner—Jeffery Thurlow
Attorney, Agent, or Firm—Learman & McCulloch

[57] ABSTRACT

A continuous, self-wiping, multiple parallel shaft processing and/or extruding system wherein material is charged to a barrel in which the shafts extend at one end and discharged at another. The barrel has an interior chamber defined by parallel intersecting cylinders providing generally V-shaped saddles at their confluence, and parallel shaft rotate within the cylinders at the same speed of rotation and in the same direction of rotation Radially co-wiping helical processing elements are fixed respectively on the shafts and are configured to also wipe the walls of said cylinders. A vent for egressing volatiles leads from the chamber, and a vent bypass passage has a first section leading from the chamber upstream from the vent, a midsection extending coextensively with the chamber within the barrel, and a return section returning to the chamber. The helical processing elements including forwardly pitched elements for moving material in the chamber toward the vent and reversely pitched helical elements immediately upstream from the vent.

16 Claims, 3 Drawing Sheets

DEVOLATILIZING AND/OR PROCESSING SYSTEMS AND METHODS

This invention relates to continuously fed and continuously discharging, vented, self-wiping, processing systems having parallel material conveying helical elements on shafts extending through longitudinally extending chambers formed of intersecting parallel cylinders. In such systems, the helical elements completely co-wipe one another and the walls of the chambers, and the shafts accordingly must be driven at the same speed of rotation and in the same direction. The present assignee's U.S. Pat. Nos. 3,195,868; 4,36,968; 4,385,876; and 4,752,135, which I incorporate by reference, describe mixers of this general character.

When such systems have to be vented between their charge and discharge ends to permit the removal of dissolved or entrained volatiles from the material being mixed or processed, problems arise with the possible entrainment of the fluent synthetic polymer or other material being processed in the gases being vented off at the vent port, and in the possible plugging or fouling of the vent port with the material.

SUMMARY OF THE INVENTION

The present invention is concerned with the solution of these problems in multiple shaft systems or processes employing helical material forwarding elements to move the material down to a vent port from which volatiles may be released.

One of the prime objects of the invention is to provide a system of this character which provides a by-pass channel extending axially parallel to the mixing chamber, wholly within the barrel which houses the chamber, in combination with reversely pitched, co-wiping helical elements on the mixer shafts which divert the fluent or viscous liquid material being forwarded into the bypass channel for return to the mixing chamber downstream from the vent port and the reversely pitched helical elements.

Another object of the invention is to provide a combination of the character described wherein the diverting helical elements function to return any material which may have moved past the mouth of the bypass channel.

A further object of the invention is to provide a system of the type described wherein the material being processed is, for practical purposes, prevented from becoming entrained in the volatiles moving out the vent port, and from fouling the vent port.

Another object of the invention is to provide a system of this type wherein the temperature of the material proceeding in the barrel contained-bypass channel is readily maintained by the barrel.

Still a further important object of the invention is to provide a system of this type which does not risk leakage of the material from the barrel.

Still another object of the invention is to provide a bypass channel communicating with the chamber through the saddle of the figure eightshaped barrel of the system to access both cylinders of the chamber and remove material uniformly from them.

Other objects and advantages of the invention will become apparent with reference to the accompanying drawings and the accompanying descriptive matter.

DESCRIPTION OF THE PREFERRED EMBODIMENT

Figure 1:
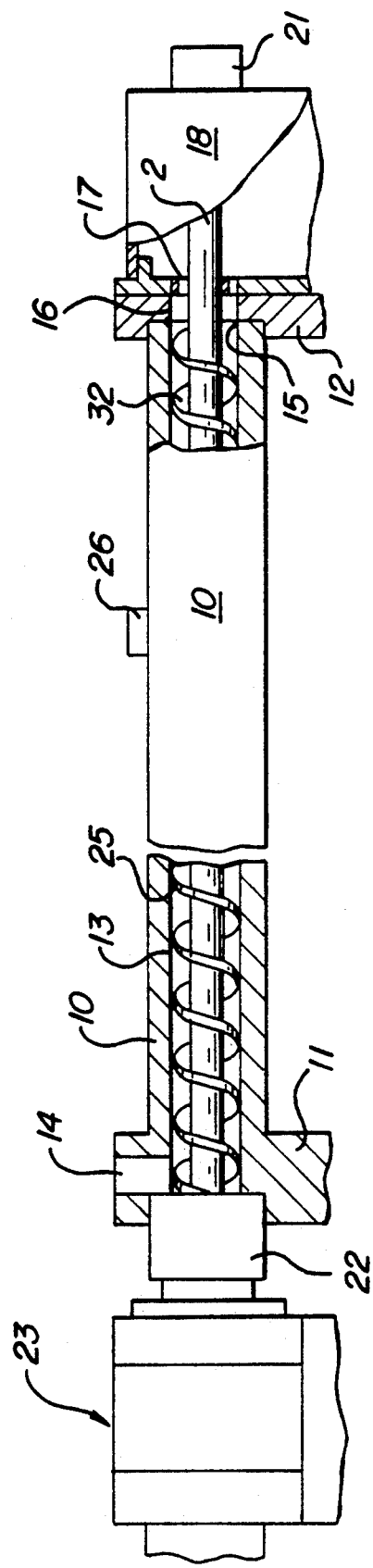
FIG. 1 is a partly sectional, schematic side elevational view of a typical system.

Referring now more particularly to the accompanying drawings for an understanding of the invention and the environment in which it finds use, the mixing or processing barrel, generally designated 10, is disclosed, as supported on front and rear machine frame members 11 and 12 respectively. As FIG. 3 particularly indicates, the barrel 10 is comprised of upper barrel section 10a and a lower barrel section 10b, which may be mounted in the manner indicated in the aforementioned U.S. Pat. No. 4,385,876. The upper and lower housing blocks, 10a and 10b, in closed position, may be drawn further toward face to face sealing abutment with each other by a plurality of clamping assemblies. Also the normal chamber liners, with appropriate apertures, may be provided for such barrel sections 10a and 10b in the manner disclosed in U.S. Pat. No. 4,385,876.

Provided within the housing or barrel 10, is a figure eight-shaped mixing or processing chamber 13 for synthetic plastic materials and the like, which extends from a material supply opening 14 at its front end to a material egressing opening 15 in its rear end. As will be noted, the opening 15 leads to an opening 16 provided in the frame element 12 and an opening 17 provided in a discharge housing 18 or the like.

Provided to extend axially through the intersecting twin cylindrical bores 13a constituting the mixing chamber 13, which define upper and lower saddle configurations 13b and 13c at their confluence, are twin shafts 19 and 20 which may extend through discharge housing 18 to be supported by suitable bearings in a bearing housing 21. In other installations, such as for instance, when there is to be discharge through a die which closes the discharge end of chamber 13, the discharge ends of shafts 19 and 20 may terminate short of the end of chamber 13, with bores 13a functioning as their bearings at this end. The shafts 19 and 20 may be journaled at their opposite charge ends in a coupling housing 22, connecting them with a pair of motor driven shafts driven by a motor drive assembly 23 or supported in any other suitable manner. The motor drive assembly 23 may incorporate a single hydraulic or electrically powered drive motor operating through a suitable gear drive mechanism to drive both of the shafts 19 and 20, or may incorporate plural motors for driving the shafts 19 and 20 through suitable drive gear mechanisms.

Shafts 19 and 20 at the upstream end of the mixer have intermeshing material advancing worm sections 25 of lenticular cross section which may be keyed thereon in the usual manner by keys K for directing material being mixed or processed in a direction from left to right in FIG. 1 toward a vent passage 26, which preferably is connected to a source of vacuum, such as a conventional vacuum pump. While not shown, the worm sections 25 may, over part of their length, be replaced by mixing and kneading paddles of the type disclosed in the aforementioned Loomans U.S. Pat. No. 3,195,868, or with co-wiping paddles of other cross-sectional configuration, arranged in preferably an angular array to forward material toward the vent 26.

Figure 2:
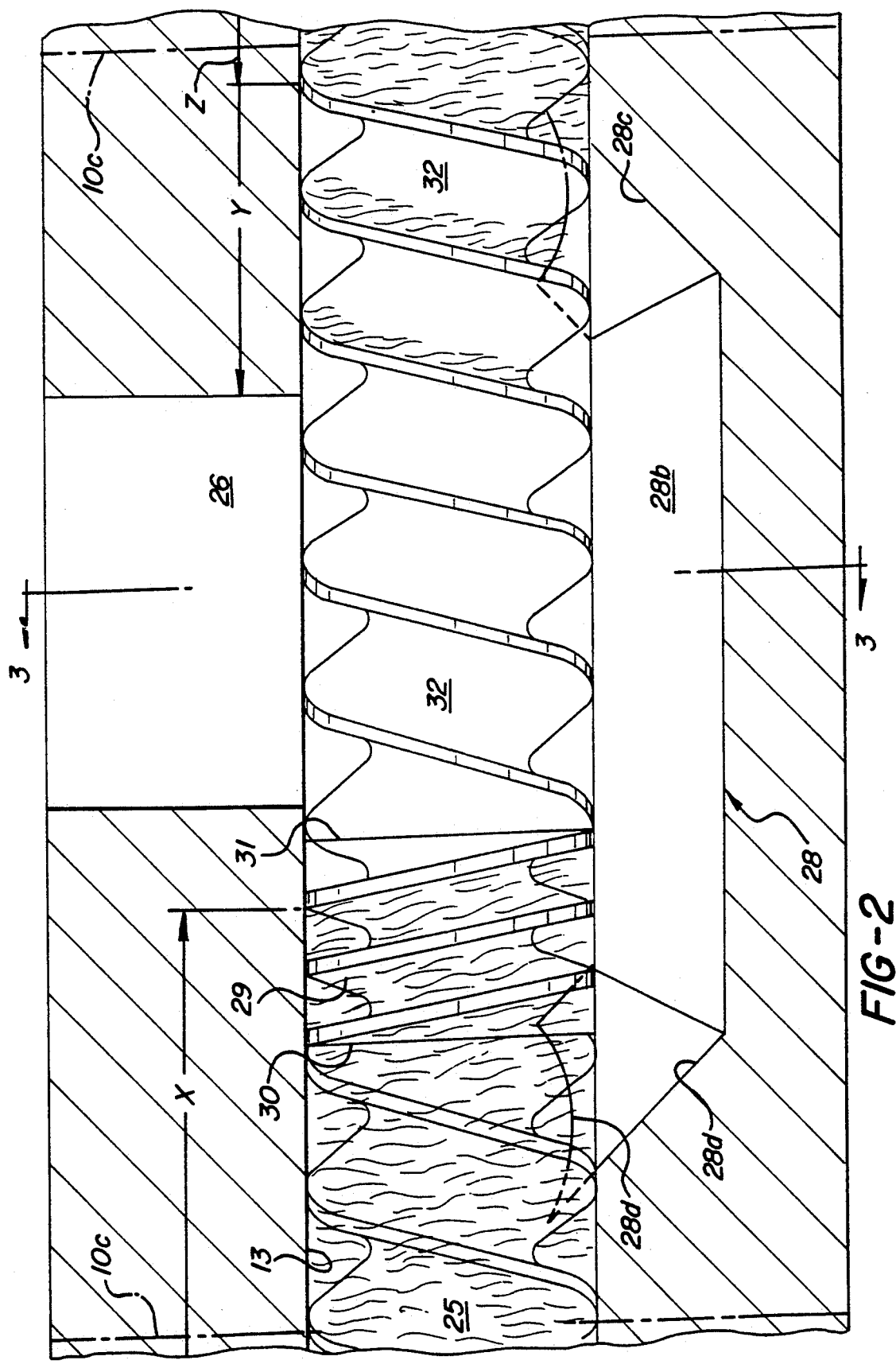
FIG. 2 is an enlarged, fragmentary, schematic side elevational view taken on the line 2—2 of FIG. 3 showing the bypass channel.

As FIG. 2 particularly indicates, a bypass channel, generally designated 28 (See FIGS. 2 and 3), longitudinally spans the vent 26 directly saddle 13c, and is bisected by a vertical longitudinal plane which also bisects the saddles 13b and 13c longitudinally, and further bisects the vent 26. Bypass channel 28, for this reason, is longitudinally adjacent the chamber 13 and will draw material uniformly from each of the chambers 13a. The channel 28 includes a downwardly angled inlet first portion 28a, a longitudinally extending midportion 28b extending parallel to chamber 13, and an upwardly angled return portion 28c which leads back to the chamber 13 beyond the vent 26. The inlet portion 28a has a mouth opening 28d. The barrel 10 at vent passage 26 may be initially formed as a barrel segment, as indicated by the chain lines 10c in FIG. 2, for ease of fabrication of the bypass 28 and this segment may be a one piece segment instead of one made up of upper and lower halves. In FIG. 4, the access axes for a drill to form the sections 28a and 28c are shown at "a" and "b" respectively. The access axis for drilling the section 28b is shown at "c", as is the plug "d" which is inserted to close off the access passage.

Figure 3:
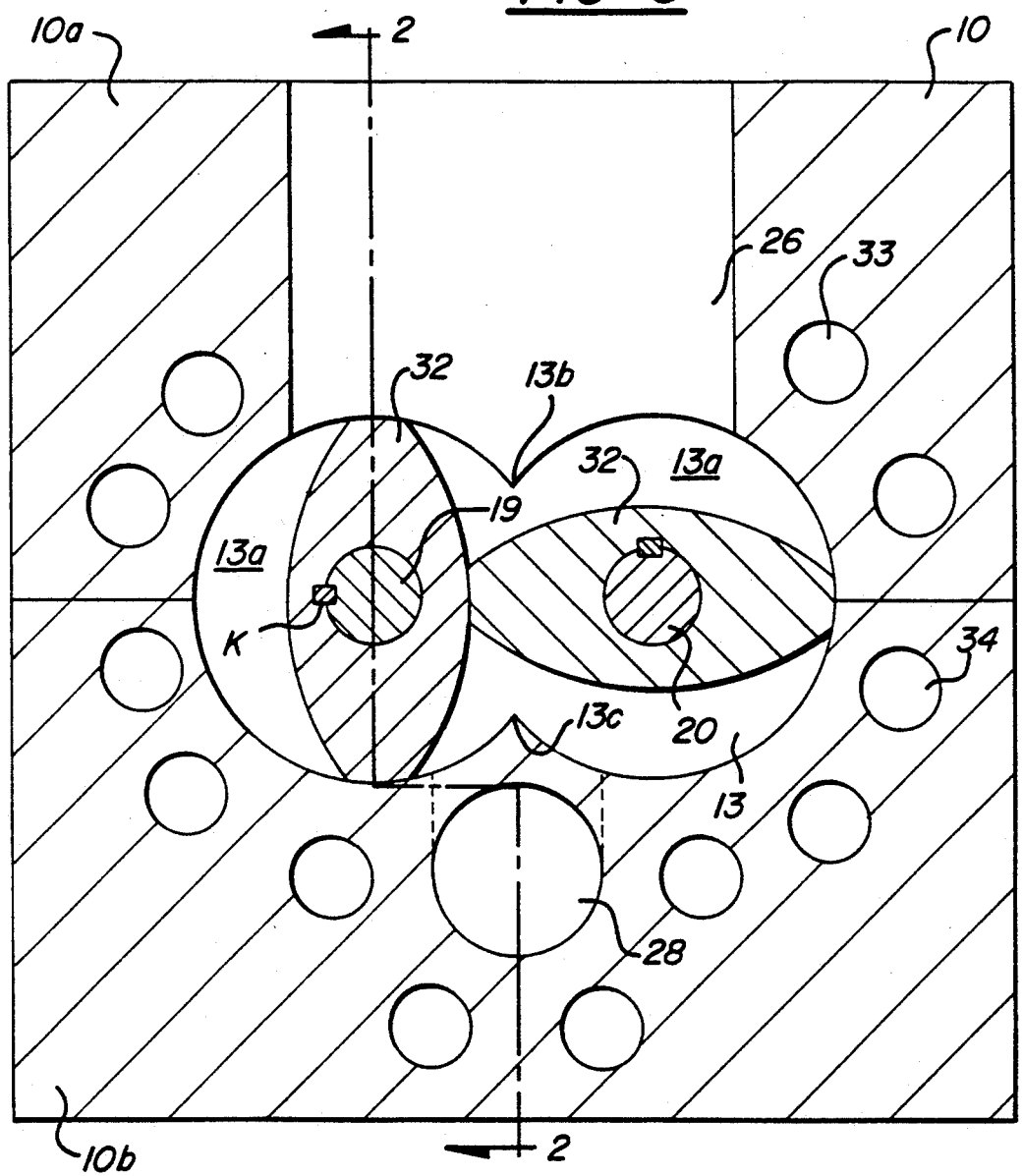
FIG. 3 is a schematic, transverse sectional view, taken on the line 3—3 of FIG. 2.
Figure 4:
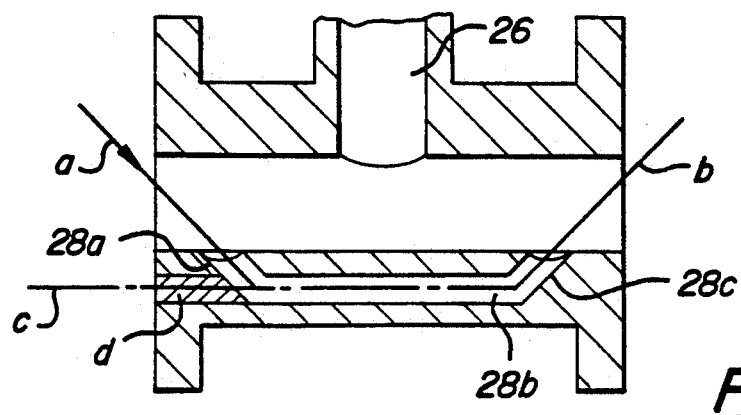
FIG. 4 is a schematic, longitudinal sectional view illustrating the manner of formation of the bypass channel in a vent segment.

Fixed on the shafts 19 and 20 immediately upstream of the vent 26, are a pair of reversely pitched screw or worm sections 29 of the lenticular cross section disclosed in FIG. 3. As do identically lenticular flight or worm sections 25, these worms 29 co-wipe one another and also completely wipe the interior walls of chamber 13. As shown in FIG. 2, the worms 29, which are more severely pitched than the more shallowly pitched worms 25, i.e. with a considerably lesser helix angle and turns of considerably lesser axial length, extend from a location 30, abutting with the front ends of worms 25, to a location 31 just upstream of vent 26. The leading edges of the worms or flights 29 are located substantially at the rear edge of the inlet mouth 28d, while worm sections 25 extend substantially to the rear edge of the mouth 28d of the channel 28.

Normally, the rate of supply of material through the opening 14 to the mixer is not sufficient to completely fill the chamber 13 as the material flows forwardly and bypass channel 28 is of such diameter as to accommodate all of the flow, without subjecting the material flowing in bypass passage 28 to any substantial additional internal pressures, other than those provided by advancing worm sections 25. Because the reversely pitched worm sections 29 are more severely pitched, the chamber 13 is, however, completely filled for a distance upstream of the front edge of bypass channel portion 28a to provide a melt seal for vapors or gases which are to exit via vent 26 and for an axial distance extending forwardly approximately to the middle of worm sections 29 in a zone x. Volatiles which are in the melt are drawn by suction to the vent 26 after the melt reenters the chamber 13 via channel return portion 28d. These volatiles may comprise vapor such as air or carbon dioxide and vapors which have sufficient volatility to be generated from the material at processing temperatures and pressure i.e. vacuum.

Downstream of worm sections 29, worm sections 32 are fixed on each of the shafts 19 and 20 to extend from the location 31 forwardly under the vent 26, and forwardly at least some distance beyond the entrance of bypass channel return portion 28c. For the sake of simplicity, worm sections 32, which are identical to worm sections 25, are shown as extending to the discharge end of the mixing chamber, however, again, mixing paddles of the type disclosed in the aforesaid U.S. Pat. No. 3,195,868 may be utilized in a portion of the chamber 13 which is downstream from bypass return section 28c. As FIG. 2 discloses, the chamber 13 has a portion providing a melt seal zone z which can extend for a considerable axial distance until the screws begin to develop pressure for discharge. Immediately downstream the chamber 13 is only partially filled in a zone y to facilitate venting between the vent 26 and its discharge end 15 to prevent air from being drawn in by the suction applied by vent 26.

THE OPERATION

In practice, the polymer or other material is fed through the opening 14 into forwarding flights 25 which push the material axially toward the discharge 17. To heat the material, and melt it when it is not in a liquid form, and then maintain it at desired processing temperatures, a network of longitudinally extending bores 33 and 34 are provided in the barrel halves 10a and 10b, respectively, as shown. The bores 33 around the upper portion of chamber 13, and the bores 34 around both the bypass channel 28 and the lower portion of chamber 13, may extend substantially from one end of each of the blocks 10a and 10b to the other, and the bores 33 and 34 will connect through suitable headers to a source of recirculating temperature controlled fluid. Generally this fluid such as water, steam, or oil, is heated to a particular temperature which will keep the plastic material in a melted condition and within a viscosity range suitable for the process. The channels 34 surrounding bypass passage 28 span the entire passage 28 and may extend substantially further, dependent on the processing occurring. Other temperature controlling elements are also contemplated such as appropriate barrel jackets, or an electrically powered heater in facial engagement with the block 10b below channel 28.

Material forwarded by the screws 25 is delivered to the section 28a of the bypass channel 28 and diverted by the reversely pitched flights or threads of worm sections 29, and the material they are carrying, in a reverse direction, to the mouth opening 28d. With the portion of the chamber shown in FIG. 2 at the left of bypass channel opening 28d completely filled with melt material by reason of the positive pressure developed by self-wiping flights 29, air incursion which could degrade many polymers (such as in nylon 6, 6 finishing) is prevented, while the liquid plastic material flows fully through bypass channel 28. The material forwarding worms sections 32 span the return passage 28c of channel 28 to keep the material return flowing forwardly and prevent its backflow to the vent 26, while the removable volatiles can be pulled to vent 26. The vent region accordingly extends from the mid portions of worms 29 to the worm sections 32 just downstream of return section 28c. Because the worm sections 32 also extend under and span the vent 26, insurance is provided against material collecting under the vent 26 and degrading. The flow rate is constant throughout the axial length of the barrel. Various vent port configurations, other than that illustrated, are possible, and conventional vent port stuffers are employable, where the particular process necessitates them. The barrel discharge, quite normally, may be accomplished through a die or the like which restricts flow sufficiently to develop pressures aiding the helical sections 32 to develop a melt seal downstream from the return section of bypass passage 28.

It is to be understood that the embodiments described are exemplary of various forms of the invention only and that the invention is defined in the appended claims which contemplate various modifications within the spirit and scope of the invention.

I claim:

1. Continuous, self-wiping, multiple parallel shaft processing and/or extruding systems wherein material is charged to a barrel, in which the shafts extend, at one end and discharged at another, comprising:
   (a) an elongate, axially extending barrel with an interior wall defining a longitudinally extending chamber with twin parallel intersection side-by-side cylinders providing generally V-shaped saddles at their confluence in saddle regions, the barrel having an inlet end with an inlet for material to be processed and an outlet end with an outlet for discharging material;
   (b) processing mechanism including a pair of parallel shafts supported to rotate on spaced parallel axes and extending within said cylinders from the inlet end of the barrel to the outlet end, said mechanism including drive motor elements connected with said shafts for driving them at the same speed of rotation and in the same direction of rotation, and further including upstream and downstream radially co-wiping helical processing elements fixed respectively on said shafts which are configured to also wipe the walls of said cylinders;
   (c) a vacuumized vent for egressing gases disposed in said barrel in a venting region between said upstream and downstream elements and leading from said chamber;
   (d) and a bypass passage, of a diameter to take the full volume of material moving in said chamber, having a first section leading from said chamber upstream from said vent through one of said saddle regions, a mid-section spaced from said barrel chamber extending longitudinally coextensively with said chamber within said barrel along said one of said saddle regions, and a return section returning to said chamber through said one of said saddle regions downstream of said vent;
   (e) said upstream helical processing elements including forwardly helical elements for moving material in said chamber toward said vent and helical elements reversely pitched relative thereto immediately upstream from said vent for creating a melt seal of material upstream of said bypass passage and directing the material being processed into said bypass passage, while preventing material from passing directly through the venting region; and
   (f) said downstream helical elements including co-wiping, forwardly helical elements extending in said vent region toward said return section of the bypass passage and beyond it to facilitate a melt seal downstream from said return passage.

2. The system of claim 1 wherein a network of longitudinally extending, temperature controlled recirculating fluid passages within said barrel radially surrounds said chamber and bypass passage.

3. The system of claim 2 in which said bypass passage on one side borders said chamber and said network includes longitudinal passages on the remaining sides of said bypass passage.

4. The system of claim 1 in which said vent leads vertically upwardly from said chamber to the exterior thereof with its centerline lying in a longitudinally extending vertical plane bisecting the upper and lower saddles; the axial center of said bypass passage also lying in said plane.

5. The system of claim 1 in which said first section and return section of said bypass passage extend longitudinally at a sloped angle to the longitudinal extent of said chamber.

6. The system of claim 1 in which said co-wiping helical elements create a flow rate which is constant through said barrel.

7. Continuous, self-wiping, multiple parallel shaft processing and/or extruding systems wherein synthetic plastic and other material is charged to a barrel, in which the shafts extend, at one end and discharged as a liquid mass at another, comprising:
   (a) an elongate, axially extending barrel with an interior wall defining a longitudinally extending chamber with twin parallel intersecting cylinders providing generally V-shaped saddles at their confluence in saddle regions, the barrel having an inlet end with an inlet for material to be processed and an outlet end with an outlet for discharging material;
   (b) processing mechanism including a pair of parallel shafts supported to rotate on spaced parallel axes and extending within said cylinders from the inlet end of the barrel to the outlet end, said mechanism including drive motor elements connected with said shafts for driving them at the same speed of rotation and in the same direction of rotation, and further including upstream and downstream radially co-wiping helical processing elements fixed respectively on said shafts which are configured to also wipe the walls of said cylinders;
   (c) a vent in a venting region of said chamber for egressing volatiles disposed by said barrel between said upstream and downstream elements and leading from said chamber to the exterior of said barrel;
   (d) a vent bypass passage, contained in said barrel, spanning the venting region and having a first section leading from said chamber upstream from said vent, a mid-section spaced and isolated from the barrel chamber extending longitudinally generally coextensively with said chamber within said barrel, and a return section returning to said chamber downstream of said vent; and
   (e) a system for changing the temperature of said barrel from ambient and thereby controlling the temperature of material in said bypass passage;
   (f) said helical processing elements including forwardly pitched helical elements for moving material in said chamber from said inlet toward said vent and helical elements reversely pitched relative thereto immediately upstream from said vent for directing the material being processed into said bypass passage and preventing material from reaching said vent; and
   (g) said downstream helical elements including co-wiping, forwardly helical elements extending to said vent region toward said return section of the bypass passage and beyond it to facilitate a melt seal downstream from said return passage.

8. The system of claim 7 wherein a network of longitudinally extending, temperature controlled recirculating fluid passages within said barrel, extending coextensively with said bypass passage, surround said bypass passage.

9. The system of claim 8 in which said bypass passage on one side borders said chamber and said network includes longitudinal passages on the remaining sides of said bypass passage.

10. The system of claim 8 wherein said network extends longitudinally along said barrel from one end of said bypass passage to the other.

11. The system of claim 8 in which said network extends in said barrel from near said inlet to near said outlet.

12. The system of claim 7 wherein said cylinders are horizontally side-by-side and said barrel is longitudinally split and comprised of an upper and lower half with horizontal mating surfaces lying in a horizontal plane which bi-sects said side-by-side cylinders; and said bypass passage is radially opposite one of said V-shaped saddle regions in the lower half of said barrel; said cylinders having lowermost surfaces and said bypass passage midsection having an uppermost surface substantially horizontally in line with said cylinder lowermost surfaces to keep said flow in the bypass passage close to the chamber.

13. The system of claim 7 in which said first section of the bypass passage has a mouth opening to said chamber at a spaced distance upstream from said vent; said reversely pitched elements are disposed between said mouth opening and said vent; and forwardly pitched co-wiping elements of the same pitch as said upstream forwardly pitched elements are provided on said shafts at said vent, immediately downstream from said reversely pitched elements, which extend downstream beyond the return section of said bypass passage.

14. The system of claim 7 in which said reversely pitched helical elements comprise turns of less axial length than said forwardly pitched helical elements.

15. A method of operating a continuous, selfwiping, multiple parallel shaft processing and/or extruding system wherein synthetic plastic or like material is charged to a barrel, in which the shafts extend, at one end and discharged as a liquid mass at another, the system having:

(a) an elongate, axially extending barrel with an interior wall defining a longitudinally extending chamber with twin parallel intersecting cylinders providing generally V-shaped saddles at their confluence in saddle regions, the barrel having an inlet end with an inlet for material to be processed and an outlet end with an outlet for discharging material;

(b) processing mechanism including a pair of parallel shafts supported to rotate on spaced parallel axes and extending within said cylinders from the inlet end of the barrel to the outlet end, said mechanism including drive motor elements connected with said shafts for driving them at the same speed of rotation and in the same direction of rotation, and further including upstream and downstream radially co-wiping helical processing elements fixed respectively on said shafts which are configured to also wipe the walls of said cylinders.

(c) a vent in a venting region of said chamber for egressing volatiles, disposed in said barrel between said upstream and downstream elements, and leading from said chamber to the exterior of said barrel;

(d) a vent bypass passage spanning the venting region and contained in said barrel, having a first section with a mouth leading from said chamber upstream from said vent, a mid-section spaced from the barrel chamber extending longitudinally generally coextensively with said chamber within said barrel, and a return section returning to said chamber downstream of said vent; and (e) a system for controlling the temperature of said barrel;

(f) said helical processing elements including forwardly pitched helical elements for moving material in said chamber from said inlet toward said vent and helical elements reversely pitched relative thereto immediately upstream from said vent; the steps of:

(g) forwarding said material via said forwardly pitched co-wiping helical elements on said shafts;

(h) upstream from said vent at said mouth creating a back flow of material filling said chamber at said mouth via said reversely pitched helical elements to create a first melt seal of material upstream from said mouth and move the material being forwarded into said mouth and bypass passage;

(i) downstream from said return section creating a second melt seal of material;

(j) creating a suction pulling volatiles upstream from said second melt seal to said vent; and (k) maintaining the temperature of material flowing through said first, mid-section, and return sections of said bypass passage by heating said barrel and transferring the heat from said barrel to said bypass passage.

16. The method of claim 15 wherein flow is constant through said barrel.

* * * * *

UNITED STATES PATENT AND TRADEMARK OFFICE
CERTIFICATE OF CORRECTION

PATENT NO. : 5,306,452
DATED : April 26, 1994
INVENTOR(S) : David B. Todd

It is certified that error appears in the above-identified patent and that said Letters Patent is hereby corrected as shown below:

In the Abstract, line 8, after "rotation" (second occurrence) insert a period.

Column 1, line 14, change "4,36,968" to -- 4,136,968 --.

Column 3, line 10, after "directly" insert -- below --.

Column 5, line 21, change "intersection" to -- intersecting --.

Column 6, line 68, change "to" to -- in --.

Signed and Sealed this

Twenty-third Day of August, 1994

Attest:

BRUCE LEHMAN

Attesting Officer

Commissioner of Patents and Trademarks